Nov. 8, 1960 R. J. BARLOW 2,959,379
CONTROL SYSTEM FOR AIRCRAFT
Filed May 11, 1956 2 Sheets-Sheet 1

INVENTOR.
ROLAND J. BARLOW
BY
Oscar B Brumback
ATTORNEY

INVENTOR.
ROLAND J. BARLOW
BY
Oscar B Brumback
ATTORNEY

United States Patent Office 2,959,379
Patented Nov. 8, 1960

2,959,379

CONTROL SYSTEM FOR AIRCRAFT

Roland J. Barlow, Royal Oak, Mich., assignor to The Bendix Corporation, a corporation of Delaware Filed May 11, 1956, Ser. No. 584,392

6 Claims. (Cl. 244—76)

This invention relates generally to control system utilizing pressure actuated prime movers and more particularly to a device for sensing the differential pressure of a prime mover.

For control purposes, it is often desirable to measure the effort exerted by the prime mover of a servosystem in the actuation of a controlled member. The prime mover of an automatic control system for aircraft, for example, exerts little or no servo effort on the elevator surface when the craft is in level flight and in a trim condition with the surface in a streamlined position. However, if the fuel consumption or shifting of cargo should cause a change in trim, the elevator surface must be displaced to maintain the craft in level flight, and substantial servo effort is required to maintain the surface displaced. As described in U.S. Patent No. 2,733,879, issued to P. A. Noxon, a control effect corresponding to this servo effort may be utilized to actuate a trim tab on the elevator surface in a direction to reduce the servo effort to zero. The servo effort of a pressure actuated power means may be determined directly by measuring the difference in pressure across the pressure and exhaust sides of the power means.

An object of the present invention, therefore, is to provide novel apparatus for measuring the differential pressure across a pressure actuated power means.

Another object is to provide a novel apparatus for developing an electrical signal corresponding in sense and magnitude to the direction and extent of the differential pressure across a pressure actuated power means.

A further object is to provide a novel apparatus for indicating the differential pressure existing across a pressure actuated prime mover.

Another object is to provide a novel system responsive to the effort exerted by a pressure actuated prime mover on the control surface of an aircraft for developing a corresponding electrical signal to actuate an electrical trim tab servomotor to drive the trim tab in a direction to reduce the effort to zero.

A further object is to provide novel control system wherein a pressure actuated prime mover is activated in response to an electrical signal and the activation is damped as a function of the differential pressure exerted on the prime mover.

The present invention contemplates a novel sensor having a member torsionally urged to a center position and movable therefrom by the pressure differential existing between the pressure and exhaust sides of a pressure actuated prime mover to develop an electrical control effect corresponding to the movement. The electrical control effect may actuate a relief system, actuate an indicator to provide a visual indication of the condition of the prime mover, and may damp the operating of the prime mover.

The foregoing and other objects and advantages of the invention will appear more fully hereinafter from a consideration of the detailed description which follows, taken together with the accompanying sheets of drawing wherein one embodiment of the invention is illustrated by way of example. It is to be expressly understood, however, that the drawing is for the purpose of illustration and description only, and is not intended as a definition of the limits of the invention.

In the drawings wherein like parts are marked alike:

Pressure actuated prime movers for aircraft are generally of the tandem type, i.e., having two separate hydraulic systems mounted on the same common shaft. The pistons of the two hydraulic rams are actuated by two different pumping systems even though they are located on the same shaft. This provides a safety feature in that one hydraulic system remains operative even though the other may have failed.

Figure 1:
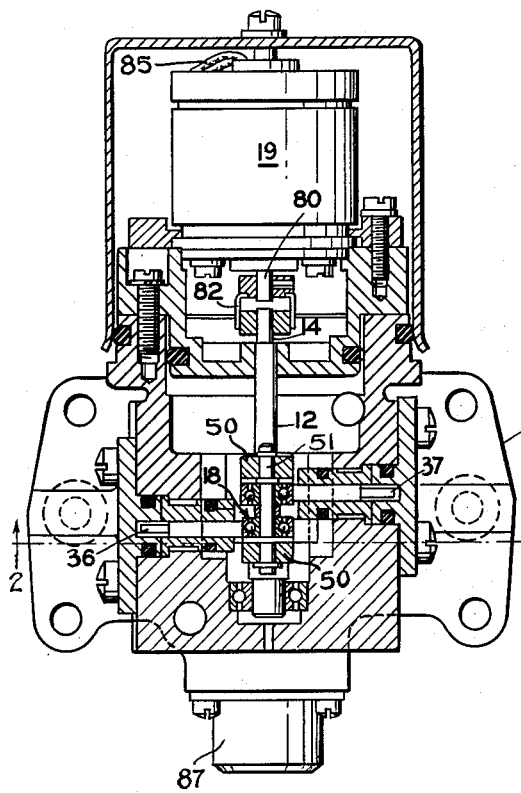
Figure 1 is a plan view of the novel sensor of the present invention with sections broken out to show inner details.

The novel load sensor of Figure 1 is illustrated as being adapted for a tandem arrangement of hydraulic systems although not restricted thereto. The sensor includes a base 10 adapted to be mounted on a hydraulic ram or actuator 11, a torsion tube 12 for maintaining a shaft 14 in a normally centered position, two pairs of pressure controlled pistons 36, 37, an extension 18 on the shaft engaged by the pistons, and a signal device 19 actuated by the displacement of shaft 14.

Figure 2:
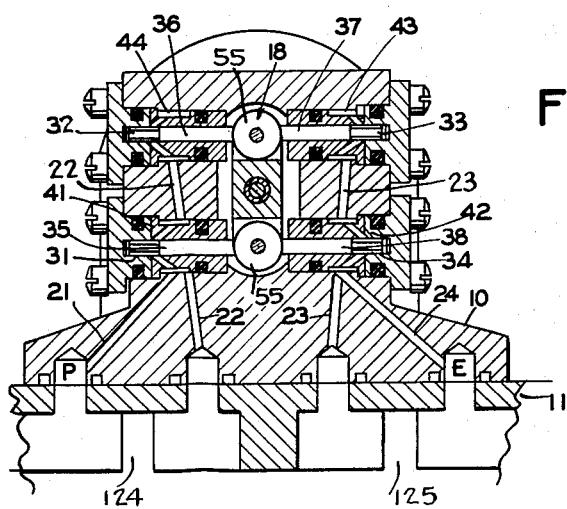
Figure 2 is a sectional end view of the base of the sensor taken along the lines 2—2 of Figure 1 with the base mounted on a hydraulic ram and showing a fragmentary portion of the ram.

Base 10, Figure 2, includes four ducts 21, 22, 23 and 24. Ducts 21 and 22 connect with the fluid pressure and exhaust sides of piston 124 of one ram of the tandem system, and ducts 23 and 24 connect with the fluid pressure and exhaust sides of piston 125 of the second ram. Each duct leads to a cylinder 31, 32, 33, or 34 in which respective pistons 35, 36, 37 and 38 are slidable and bear against extension 18.

Figure 3:
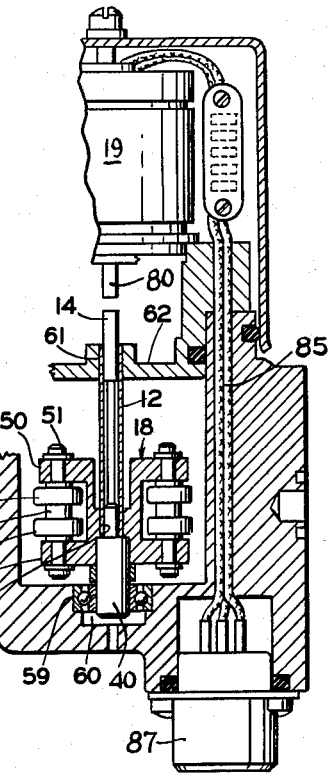
Figure 3 is a side fragmentary elevational view of the sensor of Figure 1 with certain parts shown in section and other parts broken away.

Extension 18, as best shown in Figure 3, is fixed to shaft 14 and has two bifurcated members 50 as sides. A portion 40 of the shaft 51 extends through the sections of each bifurcated member to hold bearings 54 and 55. A spacer member 56 separates the bearings so that, as shown in Figure 2, one set of bearings 54 and 55 is engaged by pistons 36 and 37 and the other set by pistons 35 and 38. As best shown in Figure 1, the inner race of each bearing is fixed to shaft 51 and the outer race is engaged by a respective piston 35, 36, 37, 38, as shown in Figure 2.

Shaft 14 extends through a torsion tube 12 and the portion 40 of the shaft 14 is journaled in one section 59 of base 10 by a suitable bearing 60. The torsion tube 12 is brazed at the outer surface of one end 61 to a second portion 62 of the base and is brazed at the inner surface of the other end 63 to the shaft 14. Thus, any load which rotates shaft 14 from center position torsionally stresses tube 12; and, when the load is removed, this torsion returns the tube to center position.

Shaft 14 is also connected to the shaft 80 of signal device 19 by a suitable spring coupling 82, as shown in Figure 1, to relieve any strains on the signal device that might be due to axial misalignment. This signal device may be a conventional synchro having stator and rotor windings (not shown). The rotor winding is operatively connected through electrical conduits 85 and an electrical plug 87 to a suitable source of alternating current.

The stator winding is fixed with base 10 and the rotor winding is energized and rotatable with shaft 80. The signal developed at the stator corresponds in phase and amplitude to the direction and extent of rotation of the rotor from center position.

Torsion tube 12 normally maintains shaft 14 centered; and, with equal pressures on both sides of the pistons of the ram to which the sensor is attached, tube 14 remains centered. Upon the application of pressure fluid for example, to the left side of pistons 124 and 125, as shown in Figure 2, and the release of pressure fluid from the right side (by conventional means not shown), piston 35 is driven to the right and piston 37 is driven to the left tending to drive piston 38 to the right and piston 36 to the left. The differential action turns shaft 14, thereby displacing the rotor of signal device 19 relative to the stator to develop a signal corresponding in phase and amplitude to the direction and amount of differential pressure. This signal may be utilized to provide an indication of the differential pressure or to operate a motor in a direction to relieve the differential pressure.

Figure 4:
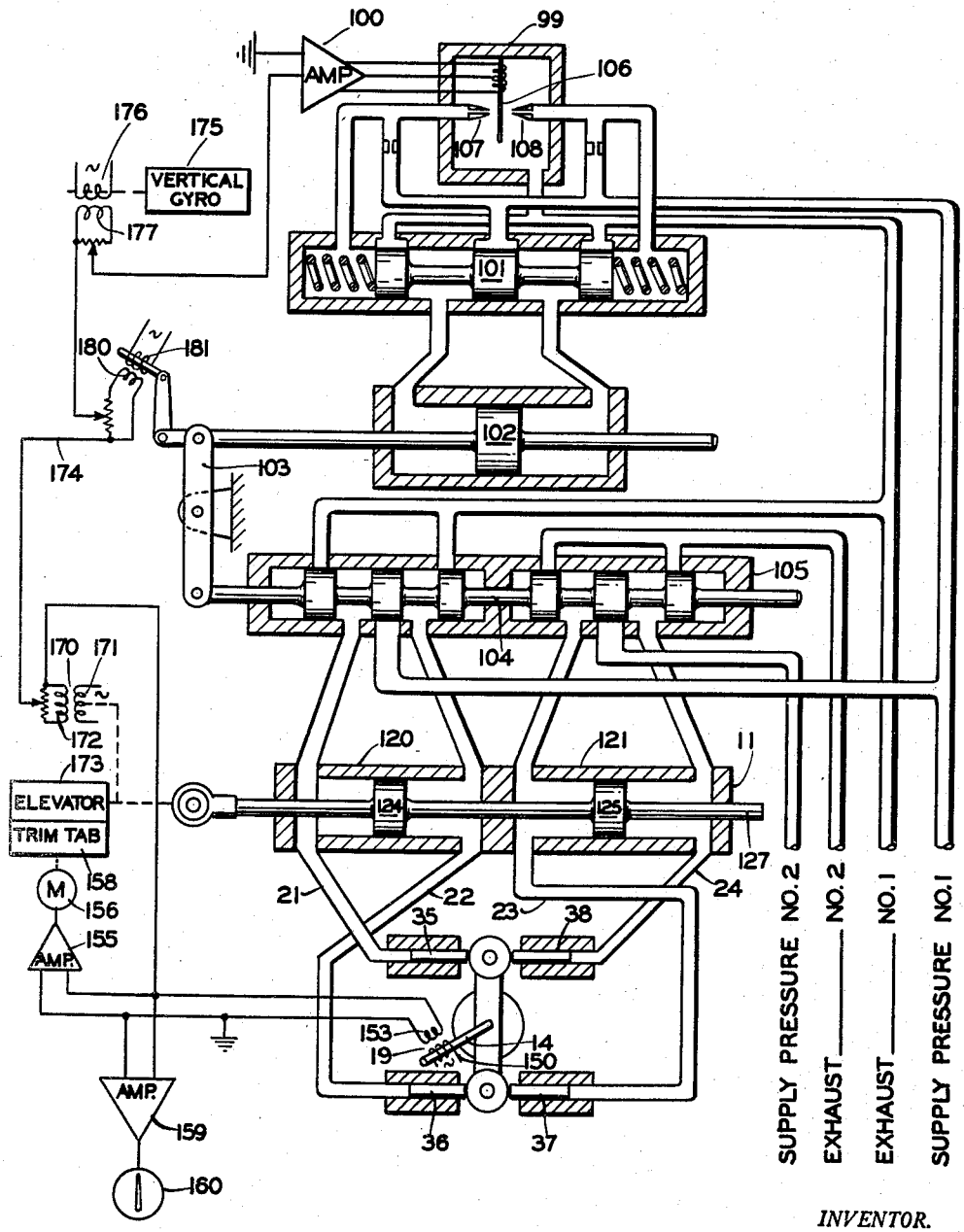
Figure 4 is a schematic illustration of a system incorporating the novel sensor of Figure 1 and controlling the pitch attitude of an aircraft.

Figure 4 shows schematically the novel differential pressure sensor of the present invention incorporated in a typical hydraulic system for controlling the elevator surfaces of an aircraft. A transfer valve 99 is operable in response to a command signal to amplifier 100 for actuating the spool of a valve 101 which controls the pressure to opposite sides of piston 102 which through a suitable mechanical connection 103 actuates a control spool 104 slidably mounted in a casing 105 and arranged for controlling the flow of fluid to the tandem ram or actuator system 11.

Transfer valve 99 may be of conventional type and comprise a flapper 106 positioned between two orifices 107 and 108 to control the differential pressure on opposed ends of a spool 101. As long as flapper 106 is centered, the pressures on the ends of spool 101 are equal. Displacement of the flapper from center toward one orifice and away from the other orifice increases the pressure on one end of spool 101 and decreases the pressure on the other end, driving the spool toward the end with the decreased pressure.

The spool 101 controls the pressure on piston 102 to drive piston 102 to the left or the right. Through mechanical arrangement 103, spool 102 displaces further spool 104 which controls the inlet and exhaust fluid from the pair of rams 120, 121 constituting actuator 11 and arranged in tandem fashion with pistons 124 and 125 on shaft 127. When the spool 104 is moved to the right, for example, fluid pressure is applied to the left hand side of each piston in the actuator 11 and fluid is dicharged from the right hand side.

Conduits 21, 22, 23 and 24 connect pistons 35, 36, 37, and 38 to the opposite sides of the actuator pistons 124 and 125. With the pressure fluid being applied to the left ends of the actuator pistons 124 and 125, the upper left piston 35 and the lower right piston 37 of the novel sensor unit tends to turn the torsion shaft 14 in a clockwise direction, but the lower pressure on the lower left hand piston 36 and on the upper right hand piston 38 oppose this turning. Thus, the net amount of turning of shaft 14 corresponds to the differential in the fluid pressures applied at each side of the pistons 124 and 125.

The displacement of the shaft 14 correspondingly displaces the rotor 150 of an inductive signal device 19 relative to its stator 153 to develop a signal corresponding in phase and amplitude to the direction and extent of the differential in the aforesaid fluid pressures applied at the opposite sides of the actuator pistons 124 and 125.

The signal from inductive device 19 may be applied through a conventional amplifier 155 to operate a motor 156 to displace the elevator trim tab 158 in a direction to reduce the load on the elevator surface and the actuator 11 to zero; the signal may also be applied through an amplifier 159 to a conventional indicator 160 to show the direction and extent of unbalance in the fluid pressures applied to the actuator pistons 124 and 125; and the signal may further be applied to amplifier 100 in opposition to a command signal there.

The command signal to the amplifier 100 may be derived from an automatic control system illustrated in a general fashion as comprising a follow-up inductive device 170 having a rotor 171 displaceable relative to the stator 172 upon movement of the elevator surface 173 to develop a follow-up signal. By way of lead 174, this signal is combined in phase opposition to an attitude signal from a conventional vertical gyro 175 having a rotor 176 displaceable relative to a stator 177 as the craft departs from a predetermined pitch attitude to develop a corresponding signal. The combined attitude and follow-up signal is connected to amplifier 100 whose output through a suitable electric motor displaces the flapper 106 of the transfer valve.

Connected to oppose the command signal in the signal chain are the differential pressure signal from inductive device 19 and the signal from an inductive device 180 whose rotor 181 is moved from a null position as spool 102 is controlled by transfer valve 99. These two signals provide an output corresponding to the rate of operation of the ram and the servo effort exerted by the ram to damp the operation of the ram, the summation of the four signals, attitude, rate, effort, and follow-up, being applied to amplifier 100.

Should the craft experience a change in trim condition due to the consumption of fuel or a shift in cargo, the prime mover 11 must maintain the surface in a displaced position to maintain the craft in level flight. The effort required to maintain the surface displaced is sensed by the novel sensor of the present invention and a corresponding signal developed at signal device 19. Through amplifier 155, this signal operates motor 156 to displace trim tab 158 in a direction to reduce the load exerted on the surface by prime mover 11 to zero.

The foregoing has presented a novel differential pressure sensor for sensing the hydraulic load applied to a servo ram. The signal from the sensor may be utilized to indicate the effort exerted by the prime mover, and in the case of an automatic control system for aircraft, may be utilized to operate the trim tab in a direction to relieve the load on the ram.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. In an automatic control system for an aircraft of a type including a control surface, an actuator to position the control surface, means responsive to attitude of the aircraft in flight, means to control said actuator, means operative by said attitude responsive means to adjustably position said control means, said control means being adjustably positioned to apply inlet and exhaust fluid pressures for controlling said actuator and thereby the position of the control surface; the improvement comprising a load sensor including means movable in response to a difference in said inlet and exhaust fluid pressures for developing a signal corresponding in phase and amplitude to the direction and extent of the difference in said fluid pressures, said load sensor including means to apply said signal to the aforementioned operative means so as to oppose the effect of said attitude responsive means on the adjusted position of the control means for the actuator, means responsive to the adjusted position of the actuator control means for developing a signal corresponding to the rate of operation of the actuator control means, and said rate signal developing means including means to apply said rate signal to the aforementioned operative means so as to oppose the effect of said attitude responsive means on said operative means tending to adjustably position the control means for the actuator.

2. In an automatic control system for an aircraft having a main control surface and a secondary control surface, an actuator to position the main control surface, means responsive to attitude of the aircraft in flight, means to control said actuator, means operative by said attitude responsive means to adjustably position said control means, said control means being adjustably positioned by said operative means so as to apply inlet and exhaust fluid pressures for controlling said actuator and thereby the position of the main control surface; the improvement comprising a load sensor including means movable in response to a difference in said inlet and exhaust fluid pressures for developing a signal corresponding in phase and amplitude to the direction and extent of the difference in said fluid pressures, motor means responsive to said signal for positioning said secondary control surface in a sense to assist said actuator to position the main control surface, means responsive to operation of the actuator control means for developing a signal corresponding to the rate of operation of the actuator control means, and means to apply said rate signal to the aforementioned operative means so as to oppose the effect of said attitude responsive means on said operative means tending to adjustably position the control means for the actuator.

3. In an automatic control system for an aircraft having a main control surface and a secondary control surface, an actuator to position the main control surface, means responsive to attitude of the aircraft in flight, means to control said actuator, said control means including means effective to apply inlet and exhaust fluid pressures for controlling said actuator and thereby the position of the main control surface; the improvement comprising first motor means to adjustably position said control means, means including electrical network means for operatively connecting said attitude responsive means to said first motor means, a load sensor including means movable in response to a difference in said inlet and exhaust fluid pressures for developing a signal corresponding in phase and amplitude to the direction and extent of the difference in said fluid pressures, second motor means responsive to said signal for positioning said secondary control surface in a sense to assist said actuator to position the main control surface, said load sensor to apply said signal to the aforementioned electrical network means so as to oppose the operative effect of said attitude responsive means on the first motor means in adjustably positioning the control means for the actuator, means responsive to the adjusted position of the actuator control means for developing a signal corresponding to the rate of operation of the actuator control means, means to apply said rate signal to the first motor means so as to oppose the operative effect of said attitude responsive means on the first motor means in adjustably positioning the control means for the actuator, means movable by the actuator for developing a follow-up signal, and said follow-up means to apply said follow-up signal to the electrical network means so as to act with the load sensor signal and the rate signal in opposing the operative effect of the attitude responsive means on the first motor means in adjustably positioning the control means for the actuator.

4. In an automatic control system for an aircraft having a main control surface and a secondary control surface; the combination comprising an actuator to position the main control surface, means responsive to attitude of the aircraft in flight, means to control said actuator, said control means including a first servo valve, a servo piston controlled by said first servo valve, and a second servo valve positioned by said piston, said second servo valve being effective to apply inlet and exhaust fluid pressures for operating said actuator and thereby positioning the main control surface, means including electrical network means for operatively connecting said attitude responsive means to said first servo valve to effect control thereof, a first signal means positioned by said actuator for applying a follow-up signal to the aforementioned electrical network means, the follow-up signal of said first signal means acting in said electrical network means in a sense to oppose the controlling effect of the attitude responsive means on the first servo valve, a second signal means positioned by said piston for applying a signal to the aforementioned electrical network means corresponding to the rate of operation of the second servo valve, the signal of said second signal means acting in said electrical network means in a sense to oppose the controlling effect of the attitude responsive means on the first servo valve, a load sensor responsive to a difference in the inlet and exhaust fluid pressures controlling said actuator and effective for developing a signal corresponding in phase and amplitude to the direction and extent of the difference in said fluid pressures, an auxiliary motor means responsive to said load sensor signal for positioning said secondary control surface in a sense to cause an air force to be applied thereto so as to assist said actuator in positioning the main control surface and thereby limit the load applied to the actuator.

5. In an automatic control system for an aircraft having a main control surface; the combination comprising main motor means to position the main control surface, means responsive to attitude of the aircraft in flight, means to control said main motor means, said control means including an auxiliary control means operative by said attitude responsive means, an auxiliary motor means controlled by said auxiliary control means, and a main control means operatively controlled by said auxiliary motor means, said main control means for controlling said main motor means and thereby the position of the main control surface, electrical network means operatively connecting said attitude responsive means to said auxiliary control means to effect control thereof, a first signal means positioned by said main motor means for applying a follow-up signal to the aforementioned electrical network means, the follow-up signal of said first signal means acting in a sense to oppose the controlling effect of the attitude responsive means on the auxiliary control means, a second signal means positioned by said auxiliary motor means for applying a signal to the aforementioned electrical network means corresponding to the rate of operation of the main control means, the signal of said second signal means acting in a sense to oppose the controlling effect of the attitude responsive means on the auxiliary control means, movable means sensitive to the load applied to said main motor means, third signal means positioned by said load sensitive means and effective for developing a signal corresponding in phase and amplitude to the direction and extent of the load applied to the main motor means, and means responsive to the signal developed by said third signal means to limit the load applied to the main motor means.

6. In an automatic control system for an aircraft having a main control surface and a secondary control surface; the combination comprising an actuator to position the main control surface, gyro means responsive to attitude of the aircraft in flight, means to control said actuator, said control means including a first servo valve, a servo piston controlled by said first servo valve, and a second servo valve positioned by said servo piston, said second servo valve effective to apply inlet and exhaust fluid pressures for controlling said actuator and thereby the position of the main control surface, electromagnetic means for operating the first servo valve, first inductive coupling means for developing a first electrical command signal, said inductive coupling means being operatively controlled by said attitude responsive gyro means, electrical network means for operatively connecting said first inductive coupling command signal developing means to the electromagnetic means for operating the first servo valve so as to effect control thereof, said electrical network means including a second inductive coupling means for developing a second electrical follow-up signal, said second inductive coupling follow-up signal developing means being operatively positioned by said actuator and applying the electrical follow-up signal to said electrical network means, the follow-up signal acting through said electrical network means in a sense opposing the controlling effect of the electrical command signal on the electromagnetic means for operating the first servo valve, said electrical network means including a third inductive coupling means for developing a third electrical signal, said third inductive coupling signal developing means being operatively positioned by said servo piston and applying the third electrical signal to said electrical network means, and said third electrical signal corresponding to the rate of operation of the second servo valve and acting through said electrical network means in a sense opposing the controlling effect of the electrical command signal developed by the first inductive coupling means, a load sensor responsive to a difference in the inlet and exhaust fluid pressures controlling said actuator, said electrical network means including a fourth inductive coupling means for developing a fourth electrical signal, said fourth inductive coupling signal developing means being operatively positioned by said load sensor and effective for developing an electrical signal corresponding in phase and amplitude to the direction and extent of the difference in said fluid pressures, an electric motor means for positioning said secondary control surface, amplifier means to apply the electrical signal of the fourth inductive coupling signal developing means to said electric motor means so as to cause said electric motor means to position said secondary control surface in a sense to cause an air force to be applied thereto tending to assist said actuator in positioning the main control surface, the electrical signal of the fourth inductive coupling signal developing means being applied through said electrical network means in a sense tending to oppose the controlling effect of the command signal on the electromagnetic means for operating the first servo valve, and the electrical signal of the fourth inductive coupling signal developing means being thereby effective through the amplifier means and the electrical network means to limit the load applied to the actuator.

References Cited in the file of this patent

UNITED STATES PATENTS

| | | |
|---|---|---|
| 625,352 | Paidassy | May 23, 1899 |
| 2,045,579 | Carlson | June 30, 1936 |
| 2,143,139 | Carlson et al. | Jan. 10, 1939 |
| 2,234,326 | Tiebel | Mar. 11, 1941 |
| 2,451,263 | Webb | Oct. 12, 1948 |
| 2,723,089 | Schuck et al. | Nov. 8, 1955 |